(12) United States Patent
Gutierrez et al.

(10) Patent No.: US 11,063,539 B2
(45) Date of Patent: Jul. 13, 2021

(54) METHODS AND SYSTEMS FOR RAPID LOAD SUPPORT FOR GRID FREQUENCY TRANSIENT EVENTS

(71) Applicant: General Electric Company, Schenectady, NY (US)

(72) Inventors: Luis Fernando Gutierrez, Queretaro (MX); John T. Nguyen, Houston, TX (US); Adnan Fareed Zafar, Cypress, TX (US); Yulimar Roa, Queretaro (MX); Jose Carlos Sanchez, Queretaro (MX); Juan Uziel Montoya, Queretaro (MX); Sreedhar Desabhatla, Munich (DE); Stephen Roy Bartlett, Erlanger, KY (US); Maxime Buquet, Belfort (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/592,205

(22) Filed: Oct. 3, 2019

(65) Prior Publication Data

US 2021/0104965 A1    Apr. 8, 2021

(51) Int. Cl.
*H02P 9/10* (2006.01)
*F01D 15/10* (2006.01)
*F02C 9/28* (2006.01)
*H02P 9/04* (2006.01)
*H02P 101/25* (2016.01)

(52) U.S. Cl.
CPC .............. *H02P 9/102* (2013.01); *F01D 15/10* (2013.01); *F02C 9/28* (2013.01); *H02P 9/04* (2013.01); *H02P 9/105* (2013.01); *H02P 2101/25* (2015.01)

(58) Field of Classification Search
CPC .. H02P 9/102; H02P 9/105; H02P 9/04; H02P 2101/25; F01D 15/10; F02C 9/28
See application file for complete search history.

(56) References Cited

U.S. PATENT DOCUMENTS 9,006,927 B2 *   4/2015   Pena .................... F02C 1/00
                                                         307/43
9,932,850 B2 *   4/2018   Chen ................... F02C 9/28
10,128,785 B1 * 11/2018   Stitt .................. H02P 9/102
(Continued)

OTHER PUBLICATIONS

Extended EP Search Report, EP20198565.2, dated Feb. 19, 2021 (8 pp.).

*Primary Examiner* — Tulsidas G Patel
*Assistant Examiner* — S. Mikailoff
(74) *Attorney, Agent, or Firm* — Eversheds Sutherland (US) LLP (57) ABSTRACT

This application provides methods and systems for rapid load support for grid frequency transient events. Example systems may include a turbine having a first controller, a generator coupled to the turbine, where the generator is configured to provide power to an electrical grid, and an exciter configured to provide a magnetic field in the generator. The exciter may include a second controller configured to monitor a first set of electrical properties associated with the electrical grid, determine that a transient event is present on the electrical grid based on the first set of electrical properties, and send a notification of the transient event to the first controller.

8 Claims, 4 Drawing Sheets

(56) References Cited

U.S. PATENT DOCUMENTS

| | | | |
|---|---|---|---|
| 10,205,414 B2* | 2/2019 | Desabhatla | H02J 3/00 |
| 10,337,348 B2* | 7/2019 | Desabhatla | H02P 9/107 |
| 2008/0071427 A1 | 3/2008 | Szepek et al. | |
| 2011/0257801 A1* | 10/2011 | Kumula | F01D 15/10 |
| | | | 700/287 |
| 2012/0161444 A1 | 6/2012 | Tarnowski | |
| 2015/0115997 A1* | 4/2015 | Gomez | H02P 9/10 |
| | | | 324/764.01 |
| 2015/0377057 A1* | 12/2015 | Desabhatla | G05B 15/02 |
| | | | 700/287 |
| 2016/0126874 A1* | 5/2016 | Hirzinger-Unterrainer | F02B 63/04 |
| | | | 290/40 B |
| 2016/0222816 A1* | 8/2016 | Chen | F01D 15/10 |
| 2017/0346430 A1* | 11/2017 | Desabhatla | H02J 3/24 |
| 2018/0198394 A1* | 7/2018 | Desabhatla | H02P 9/102 |
| 2018/0274383 A1* | 9/2018 | Desabhatla | H02P 9/102 |
| 2018/0294722 A1 | 10/2018 | Leong | |
| 2018/0337622 A1* | 11/2018 | Stitt | H02P 9/102 |
| 2018/0341882 A1 | 11/2018 | Long | |
| 2019/0145311 A1* | 5/2019 | Kleen | F02B 63/042 |
| | | | 123/3 |

* cited by examiner

METHODS AND SYSTEMS FOR RAPID LOAD SUPPORT FOR GRID FREQUENCY TRANSIENT EVENTS

TECHNICAL FIELD

This application and the resultant patent relate generally to gas turbine systems and more particularly relate to providing rapid load support responsive to grid frequency transient events.

BACKGROUND OF THE INVENTION

A power plant or power generation system may generate electrical power from other primary energy sources. For example, a prime mover, such as a gas turbine, is a rotary mechanical device with a gas turbine shaft that drives an electrical generator to supply electrical power to a transmission grid. The transmission grid, in turn, supplies electricity to various power consumers. To ensure that the power generation system operates effectively, the turbine shaft speed and resulting grid frequency should be synchronized with each other within operational ranges. When grid frequency changes abruptly due to a transient event, power outages may result.

The negative effects of transient events, such as sudden changes to grid frequency, are amplified for smaller grids, such as grids that provide a load capacity of about 500 megawatts (MW). Smaller grids are often less stable than larger grids since a load change of the same magnitude will result in a larger frequency change. Thus, smaller grids tend to experience frequency changes more often than larger grids. A lack of stability may result in blackouts and/or loss of power to the grid. Systems and methods that provide rapid load support for grid frequency transient events are therefore desired to increase the stability of power to a grid.

SUMMARY OF THE INVENTION

This application and the resultant patent provide a system for providing rapid load support using gas turbines. The system may include a turbine having a first controller, a generator coupled to the turbine, where the generator is configured to provide power to an electrical grid, and an exciter configured to provide a direct current (DC) voltage and a DC current to a rotor of the generator. The exciter may include a second controller configured to monitor a first set of electrical properties associated with the electrical grid, determine that a transient event is present on the electrical grid based on the first set of electrical properties, and send a notification of the transient event to the first controller. The first controller may be configured to adjust operation of the turbine based on the notification.

This application and the resultant patent further provide a method for providing improved load support for grid frequency transient events. The method may include monitoring, by a first controller, a first set of electrical properties associated with an electrical grid, determining, by the first controller, that a transient event is present on the electrical grid based on the first set of electrical properties, and sending a notification of the transient event to a second controller. The second controller may be configured to adjust operation of the turbine based on the notification by (i) adjusting a dynamic of fuel demand to a fuel valve governor of a turbine, and (ii) adjusting a primary frequency algorithm.

This application and the resultant patent further provide a system for providing rapid load support. The system may include a prime mover such as an aeroderivative gas turbine having a first controller, a generator coupled to the aeroderivative gas turbine, where the generator is configured to provide power to an electrical grid, and an exciter configured to provide a direct current (DC) voltage and a DC current to a rotor of the generator. The exciter may include a second controller configured to monitor a first set of electrical properties associated with the electrical grid, determine that a transient event is present on the electrical grid based on the first set of electrical properties, and send a notification of the transient event to the first controller. The first controller may be configured to adjust operation of the aeroderivative gas turbine based on the notification by (i) adjusting a dynamic of fuel demand to a fuel valve governor of the aeroderivative gas turbine, and (ii) adjusting a primary frequency algorithm.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
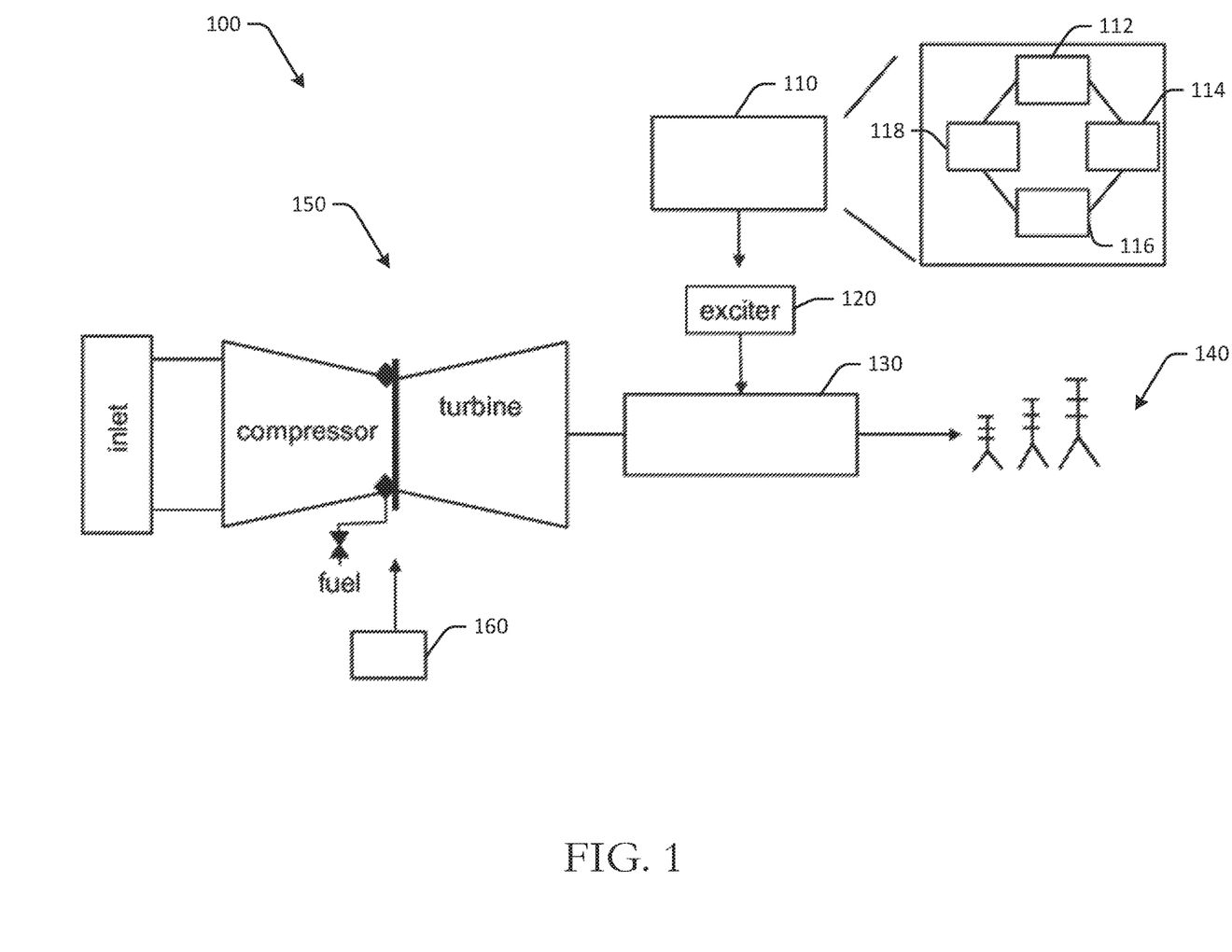
FIG. 1 is a schematic diagram of a power generation system.

Referring now to the drawings, in which like numerals refer to like elements throughout the several views. FIG. 1 is a schematic diagram of a power generation system 100. The power generation system 100 may include a prime mover that generates electrical power from other primary energy sources. An example prime mover may be a gas turbine 150, such as an aeroderivative gas turbine, and may be a rotary mechanical device with a gas turbine shaft that drives an electrical generator to supply electrical power to a transmission grid that supplies power to users. Other embodiments may include different types of turbines, such as steam turbines. For fault-free operation, turbine shaft speed and resulting grid frequency must be maintained within operational ranges.

The gas turbine 150 may be coupled to a generator 130 that supplies a electrical grid 140. The gas turbine engine 150 may include a compressor. The compressor compresses an incoming flow of air. The compressor delivers the compressed flow of air to a combustor. The combustor mixes the compressed flow of air with a pressurized flow of fuel and ignites the mixture to create a flow of combustion gases. The flow of combustion gases is in turn delivered to a turbine. The flow of combustion gases drives the turbine so as to produce mechanical work. The mechanical work produced in the turbine drives the compressor via a shaft and an external load such as the generator 130.

The gas turbine engine 150 may use natural gas, various types of syngas, liquid fuels, and/or other types of fuels and blends thereof. The gas turbine engine 150 may have different configurations and may use other types of components. Other types of gas turbine engines also may be used herein. Multiple gas turbine engines, other types of turbines, and other types of power generation equipment also may be used herein together.

The gas turbine 150 may also be coupled to a turbine controller 160. The turbine controller 160 may control operation of one or more aspects of the gas turbine 150. The generator 130 may be coupled to an exciter 120 that is controlled by an exciter controller 110. The exciter 120 may be configured to automatically regulate voltage and to supply direct current (DC) output. For example, the exciter 120 may include an electrical circuit that provides DC current and a DC voltage to field windings of a rotor of the generator 130, thereby inducing a magnetic field within the generator 130. The magnetic field may then cause the rotor to spin inside the generator and rotate the shaft of the generator 130. In addition to creating the magnetic field within the generator 130, the exciter 120 may be used to control the frequency, amplitude, and phase properties of the voltage output by the generator 130. As such, the exciter 120 may be used to synchronize the voltage output by the generator 130 with the voltage of the electrical grid 140 after the generator shaft rotates at its rated speed.

The exciter controller 110 may be a computing system that optionally includes one or more of the input interface 112, an output interface 118, one or more processors 114, and/or one or more memory devices 116. The exciter controller 110 facilitates recognition of a transient grid event in the control of the power generation system 100 as detailed below. In alternate embodiments, a controller that is separate from the exciter controller 110 can be used instead of, or in addition to, the exciter controller 110.

The power generation system 100 may use the turbine controller 160 to bring the system back in balance following a transient event on the electrical grid 140 that causes a frequency deviation. As an example, when a frequency drop in the electrical grid 140 is detected, a speed drop can be detected because the speed moves with grid frequency. Fuel intake by the prime mover would increase based on sensing the speed drop, which increases active power output to compensate for the frequency drop.

The turbine 150 may rotate a shaft in the generator 130, such that the generator 130 outputs a voltage. The voltage output of the generator 130 may then be synchronized with the voltage of the electrical grid 140. In certain embodiments, the exciter controller 110 may monitor electrical properties of the electrical grid 140. As such, the exciter controller 110 may monitor the electrical grid 140 for transient events such as a rise or fall in grid frequency, a rise or fall in active power or reactive power of the generator 130, and the like. The transient event may include changes to electrical properties such as voltage, current, power, power factor, and the like.

In some embodiments, the exciter controller 110 may be configured to detect or recognize transient grid events at the initial stages of grid transient to its occurrence. Upon detecting the transient event, the exciter controller 110 may send commands or notifications to the turbine controller 160 to adjust the operation of the prime mover and compensate for the change in frequency of the generator. That is, the exciter controller 110 may monitor electrical parameters, such as the power output and electrical frequency, of the generator 130 and detect a transient event based on the electrical parameters.

The power generation system 100 described herein may provide rapid load support responsive to grid frequency transient events via a combination of one or all of: (i) early electrical detection of grid events; (ii) using a MW modeled value instead of a measured wattmeter value (e.g., avoiding reading at the wattmeter the component of power contributed by the change in kinetic energy of the generator in response to a frequency transient); and/or (iii) using flexible dynamics for a fuel value control loop. As a result, turbine response acceleration may be implemented without oscillation of turbine frequency. Further, responsive to a decrease in grid frequency, immediate electrical power may be provided using, for example, an aeroderivative gas turbine.

Figure 2:
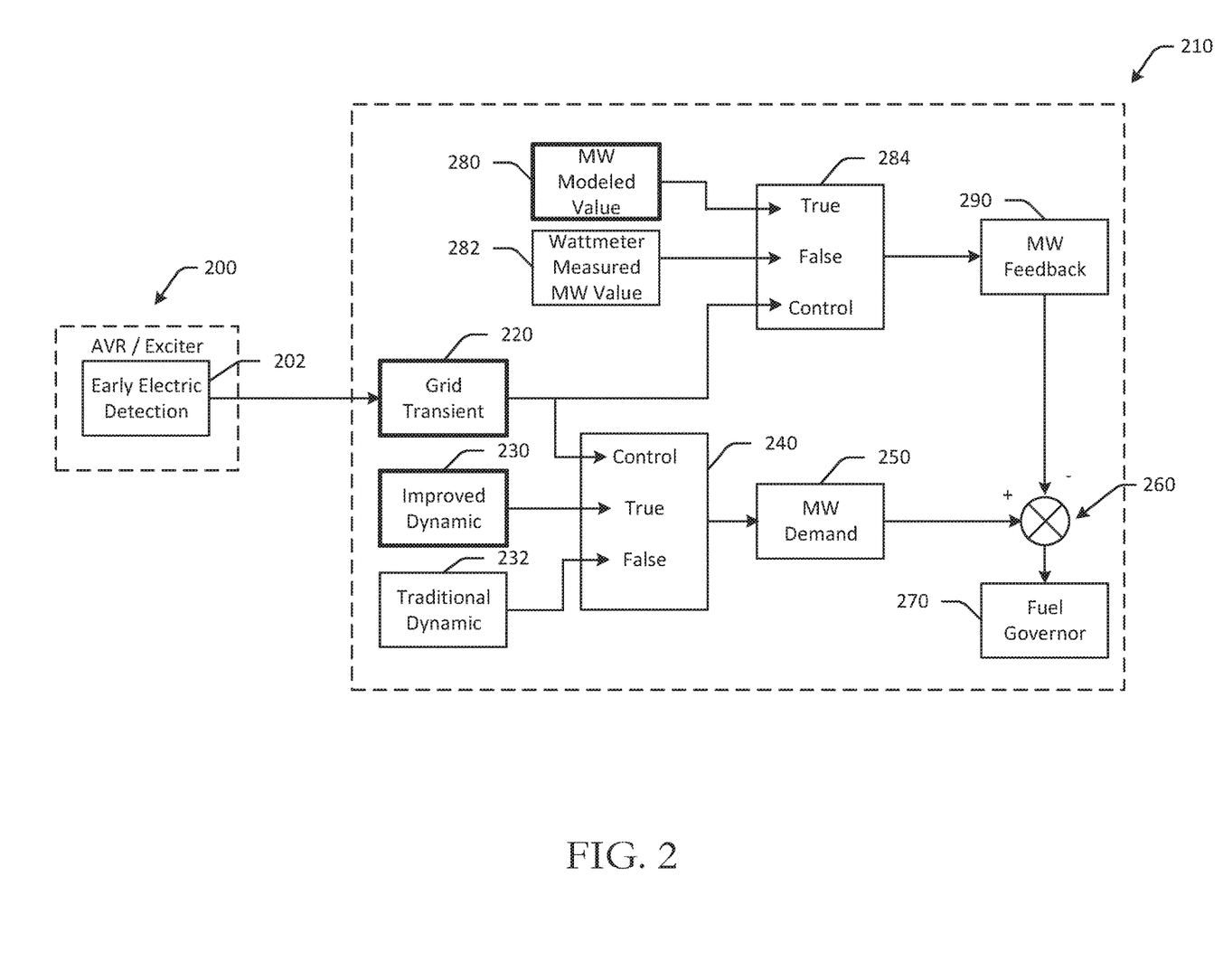
FIG. 2 is a schematic diagram of control systems for an exciter and a gas turbine as may be described herein.

FIG. 2 is a schematic diagram of control systems for an exciter and a gas turbine as may be described herein. Other embodiments may have additional, fewer, and/or different components or configurations than those discussed with respect to the example illustrated in FIG. 2.

The control systems illustrated in FIG. 2 may be used to provide fast power in response to frequency events in small grids, or electrical grids that may be unstable. Some embodiments may use aeroderivative gas turbines with fuel sources such as diesel or ethanol.

In FIG. 2, an Automated Voltage Regulator (AVR)/exciter controller 200 may be configured to control operation of an exciter that provides DC voltage and/or a DC current to a rotor of a generator. The AVR/exciter controller 200 may include one or more early electric detection modules 202. The early electric detection module(s) 202 may be configured to detect frequency drops in an electrical grid as a potential disturbance. For example, the early electric detection module(s) 202 may be configured to monitor one or more features or electrical properties of an electrical grid, such as a frequency, voltage, current, power, or power factor associated with the electrical grid. Based on changes in electrical grid features or electrical properties, the early electric detection module(s) 202 may determine whether a transient event is present on the electrical grid. For example, if one or more of frequency, voltage, current, power, or power factor associated with the electrical grid increases or decreases more than a threshold, the early electric detection module(s) 202 may determine that a transient event is occurring or otherwise about to occur. In one example, the AVR/exciter controller 200 may sense a rate of change of electrical frequency at terminals of a generator and may determine a rate of change of shaft line acceleration (where the rate of change is one of the electrical properties monitored by the AVR/exciter controller 200) in order to determine whether a transient event is occurring. When a transient event is detected, the AVR/exciter controller 200 may send a notification 220 of the transient event to a turbine controller 210. Because the AVR/exciter controller 200 may be coupled to the generator and the exciter, the AVR/exciter controller 200 may detect grid events faster and more reliably than speed measurement techniques.

The AVR/exciter controller 200 may be in communication with the turbine controller 210. The turbine controller 210 may be configured to control operation of a turbine, such as an aeroderivative gas turbine. The turbine controller 210 may receive the notification 220 of the transient event from the AVR/exciter controller 200. The turbine controller 210 may adjust operation of the turbine based on the notification 220. For example, the turbine controller 210 may adjust operation of the turbine based on a modeled value of electrical power and/or based on a dynamic of fuel demand to a fuel valve governor of the turbine.

After receiving the notification 220 from the AVR/exciter controller 200, the turbine controller 210 may modify a first operating parameter 240 of the turbine by replacing a traditional dynamic 232 of fuel demand to a fuel valve governor of the turbine with an improved dynamic 230 of fuel demand to a fuel valve governor of the turbine. The replacement of the dynamic may adjust the first operating parameter 240 to increase or decrease fuel responsive to the detected event. The first operating parameter 240 may be modified as a result of the notification 220. The replacement of dynamic may be temporary to account for the event and may be returned to normal operation after the event has passed. Flexible dynamics of the fuel valve control loop may also ensure fast response without compromising stability.

In some embodiments, in addition to or instead of modifying the fuel dynamic, the turbine controller 210 may adjust a second operating parameter 284 responsive to the notification 220. The second operating parameter 284 will be a measurement of the electrical power of the generator. Due to the rotational inertia of the rotating machinery coupled to the generator, the rotating machine gains kinetic energy as it increases in rotational velocity. When a grid transient occurs that results in a change in rotational velocity, the kinetic energy also changes. The rate of change of kinetic energy induces a component of electrical power output (and/or input), known as the inertial response, which is superposed to the component of electrical power output of the generator that is produced by the working fluids of the turbine (e.g. increase in power observed but not due to increase in fuel in the combustor). For example, a negative grid frequency transient event on a high inertia machine running with a constant power demand would result in a large positive inertial response that would increase the power feedback, thereby driving a large negative error to a fuel governor, causing the fuel governor to erroneously reduce fuel when the desired response in a frequency drop is to increase fuel to increase the power to restore system frequency. For this reason, a turbine controller that is adjusting fuel flow to a governor 270 as a function of the error between an MW demand module 250 and an MW feedback demand module 290 has an improved response through an electrical transient event by detecting the event using a switched feedback mechanism that can choose between a wattmeter measured MW value 282 or an MW modeled value 280 that may not include the inertial response, if it is known and detected that an event would result in an undesirable fuel governor response. As such, the turbine controller 210 may replace the wattmeter measured MW value 282 with the MW modeled value 280. The replacement of the value may adjust the second operating parameter 284 to increase or decrease fuel responsive to the detected event. The replacement of value may be temporary to account for the event and may be returned to normal operation after the event has passed.

In some embodiments, the turbine controller 210 may generate or determine the MW modeled value 280. For example, the turbine controller 210 may determine the MW modeled value 280 based on gas turbine high pressure compressor discharge pressure. By using the MW modeled value 280, the turbine controller 210 may avoid reading the inertial response at the wattmeter at the moment of grid event. In some instances, the MW modeled value 280 may be internally calculated by the turbine controller 210 based on variable geometry position and fuel demand.

The first operating parameter 240 may be fed into the MW demand module 250 at the turbine controller 210, which may be used to control operation of a valve 260. Similarly, the second operating parameter 284 may be fed into the MW feedback demand module 290 at the turbine controller 210, which may also be used to control operation of the valve 260. The valve 260 may be used to supply fuel to a fuel governor 270 for operation of the turbine.

Accordingly, the turbine controller 210 may be configured to generate a modeled value of electrical power, where the modeled value is a megawatt modeled value generated based on compressor discharge pressure of a compressor at the turbine. The modeled value may temporarily replace an actual generator electrical power reading at a wattmeter of the turbine. In addition, the turbine controller 210 may be configured to adjust a dynamic of fuel demand to a fuel valve governor of the turbine, where the dynamic of fuel demand is a flexible dynamic, and where the dynamic of fuel demand may be adjusted by temporarily replacing a first dynamic with a second dynamic. The second dynamic may cause a controlled acceleration of the turbine. In some embodiments, the turbine controller 210 may further be configured to determine a grid frequency boundary, and to increase valve response time to avoid oscillation of the turbine frequency response. Some embodiments may be configured such that that the fuel actuator of turbine reaches 95% of the move between initial and final position at nadir frequency, approx. 4 s, (49 Hz) for a nominal frequency of 50 Hz.

The described control system therefore ensures reliability of the turbine response for frequency events in harsh grid conditions and does not use traditional speed control. The turbine controller 210 may activate a controlled acceleration of the turbine responsive to the notification 220 through flexible dynamics of the fuel valve control, without impacting stability. Embodiments of the disclosure may adjust one or more operations of the turbine based on a modeled value of electrical power, where the one or more operations include a primary frequency algorithm, and a dynamic of fuel demand to a valve governor. As a result, immediate electrical power may be provided upon detecting a major grid frequency drop.

Figure 3:
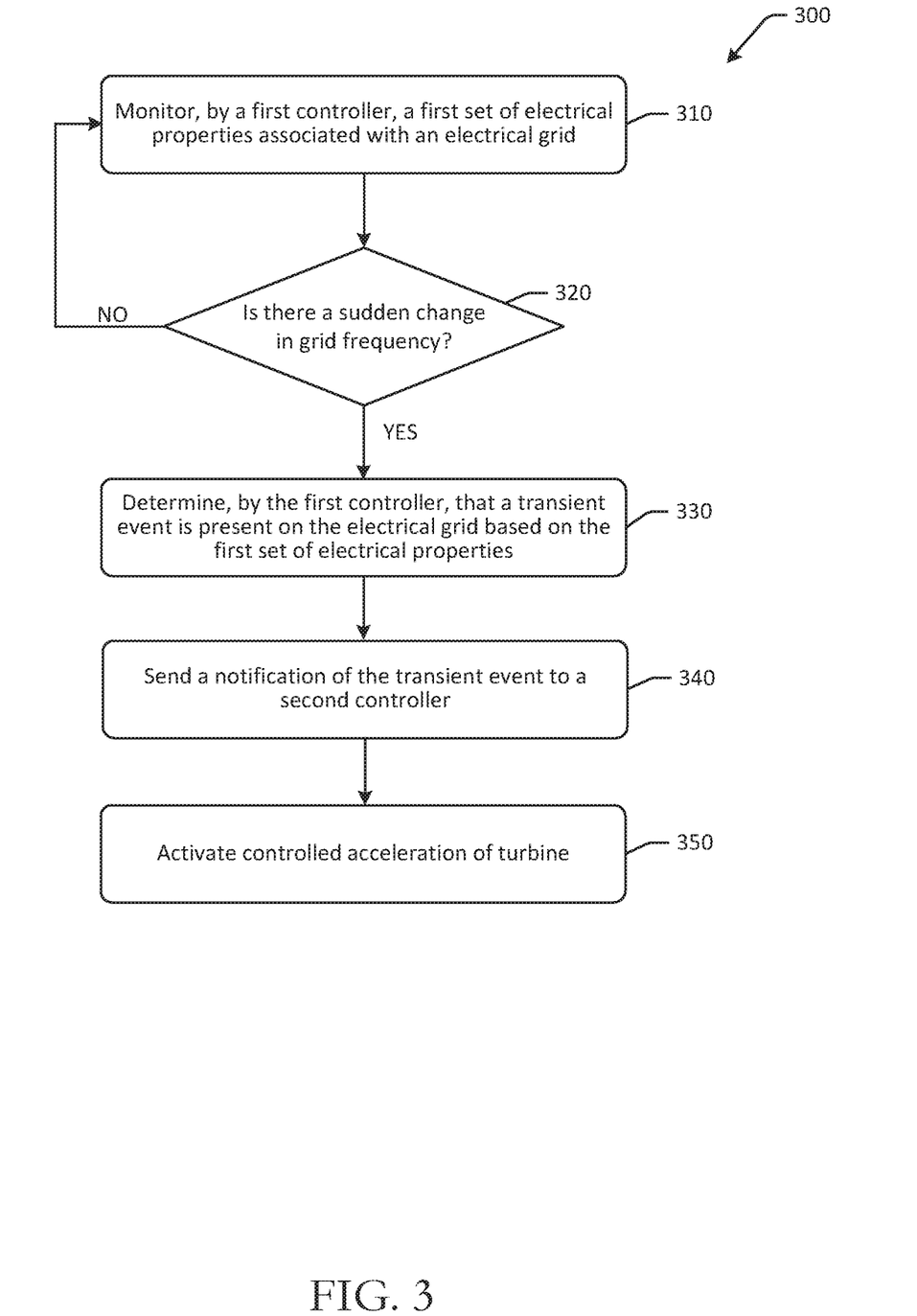
FIG. 3 is an example process flow for rapid load support for grid frequency transient events as may be described herein.

FIG. 3 is an example process flow 300 for rapid load support for grid frequency transient events as may be described herein. One or more of the operations described in FIG. 3 may be performed in different orders and/or by the same computer system or different computer systems across a distributed computing environment. In one example, the operations of FIG. 3 may be performed by the AVR/exciter controller 200 of FIG. 2.

At block 310, a first controller (such as the AVR/exciter controller 200) may monitor a first set of electrical properties associated with an electrical grid. For example, the first controller may monitor frequency, voltage, current, power, power factor, and/or other electrical properties associated with an electrical grid.

At determination block 320, a determination may be made by the first controller as to whether there was a sudden change in grid frequency. For example, the first controller 210 may determine whether one or more properties of an electrical grid, such as a grid frequency, suddenly increased or decreased more than a threshold amount. If it is determined at determination block 320 that there was no sudden change in grid frequency, the process flow 300 may return to block 310 and the first controller may be used to continue monitoring. If it is determined at determination block 320 that there was a sudden change in grid frequency, the process flow 300 may proceed to block 330.

At block 330, the first controller may determine that a transient event is present on the electrical grid based on the first set of electrical properties. For example, based on the grid frequency changing by more than a threshold amount over a certain length of time, the first controller may determine that a transient event is present on the electrical grid.

At block 340, the first controller may send a notification of the transient event to a second controller. For example, the first controller may send a notification of the transient event to a turbine controller.

At block 350, the first controller may activate controlled acceleration of the turbine. In some embodiments, the first controller may cause activation of controlled acceleration of the turbine by causing the second controller to activate controlled acceleration of the turbine. The controlled acceleration may reduce the risk of loss of power due to the rapid change in grid frequency.

Figure 4:
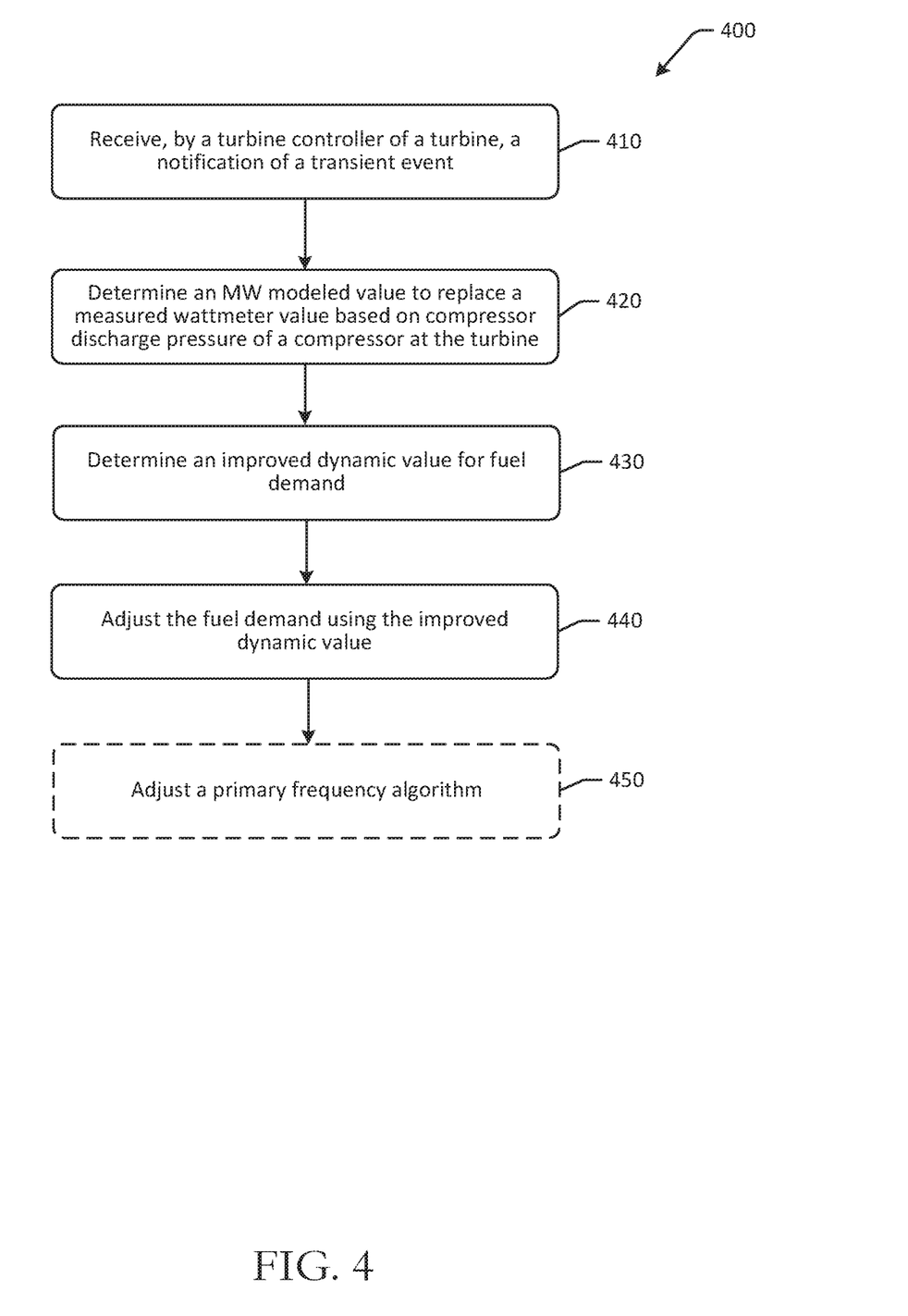
FIG. 4 is an example process flow for rapid load support for grid frequency transient events as may be described herein.

FIG. 4 is an example process flow 400 for rapid load support for grid frequency transient events as may be described herein. One or more of the operations described in FIG. 4 may be performed in different orders and/or by the same computer system or different computer systems across a distributed computing environment. In one example, the operations of FIG. 4 may be performed by the turbine controller 210 of FIG. 2.

At block 410, a turbine controller of a turbine may receive a notification of a transient event. For example, an AVR/exciter controller may detect a transient event at a generator and/or electrical grid, and the turbine controller may receive a notification of the transient event from the AVR/exciter controller.

At block 420, the turbine controller may determine an MW modeled value to replace a measured wattmeter value based on compressor discharge pressure of a compressor at the turbine. For example, the turbine controller may at least temporarily cause the measured wattmeter value to be replaced with an MW modeled value. The MW modeled value may be determined based on compressor discharge pressure of a compressor at the turbine and may be reflective of the transient event.

At block 430, the turbine controller may determine an improved dynamic fuel value for fuel demand. The improved dynamic fuel value may at least temporarily be used in place of a traditional dynamic.

At block 440, the turbine controller may adjust the fuel demand using the improved dynamic value. For example, the turbine controller may adjust the dynamic of fuel demand to a fuel valve governor of a turbine.

At optional block 450, the turbine controller may adjust a primary frequency algorithm for operation of the turbine.

As a result, the turbine controller may allow gas turbines to work with multiple kinds of fuels and providing fast responses upon grid events and may provide improved control over a fuel supply valve when controlled acceleration of a turbine is required.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. A system for power generation, the system comprising:
a generator configured to provide power to an electrical grid;
a first gas turbine coupled to the generator, the first gas turbine comprising a first controller and a compressor, wherein the first controller is configured to generate a modeled value of electrical power generated by the generator, wherein the modeled value of electrical power is based on a compressor discharge pressure of the compressor, and wherein the modeled value of electrical power represents an estimated electrical power output of the generator; and
an exciter of the generator, the exciter comprising a second controller that is configured to:
monitor a first set of features of the electrical grid, the features including a frequency of the electrical grid;
detect, based on the monitoring, a frequency drop in the electrical grid;
determine that the frequency drop is greater than a threshold;
determine, based on the determination that the frequency drop is greater than the threshold, that a transient event is present on the electrical grid; and
send a notification of the transient event to the first controller;
wherein the first controller is further configured to:
determine an updated fuel demand based on the modeled value of electrical power;
temporarily replace a default fuel demand to a fuel valve governor of the first gas turbine with the updated fuel demand responsive to the notification; and
revert to the default fuel demand after the transient event is no longer present on the grid.

2. The system of claim 1, wherein the first controller is further configured to:
replace, in a fuel demand calculation used to determine the updated fuel demand, a measured electrical power reading of the generator with the modeled value of electrical power after receiving the notification.

3. The system of claim 1, wherein the first controller is further configured to:
cause, using the updated fueled demand, a controlled acceleration of the first turbine prior to reverting to the default fuel demand.

4. The system of claim 1, wherein the second controller is further configured to:
determine, based on the monitoring, that a voltage, current, power, or power factor associated with the electrical grid has increased or decreased more than a threshold.

5. The system of claim 1, wherein the first controller is further configured to:
determine a boundary for the grid frequency in order to avoid oscillation of a turbine frequency of the first turbine.

6. A system for power generation, the system comprising:
a generator configured to provide power to an electrical grid;
a first aeroderivative gas turbine coupled to the generator, the first aeroderivative gas turbine comprising a first controller and a compressor, wherein the first controller is configured to generate a modeled value of electrical power generated by the generator, wherein the modeled value of electrical power is based on a compressor discharge pressure of the compressor, and wherein the modeled value of electrical power represents an estimated electrical power output of the generator; and
an exciter of the generator, the exciter comprising a second controller that is configured to:
monitor a first set of electrical features associated with the electrical grid, the features including a frequency of the electrical grid;

detect, based on the monitoring, a frequency drop in the electrical grid;

determine that the frequency drop is greater than a threshold;

determine, based on the determination that the frequency drop is greater than the threshold, that a transient event is present on the electrical grid; and send a notification of the transient event to the first controller;

wherein the first controller is further configured to:

determine an updated fuel demand based on the modeled value of electrical power;

temporarily replace a default fuel demand to a fuel valve governor of the first aeroderivative gas turbine with the updated fuel demand responsive to the notification; and revert to the default fuel demand after the transient event is no longer present on the grid.

7. The system of claim 6, wherein the second controller is further configured to:

determine, based on the monitoring, that a voltage, current, power, or power factor associated with the electrical grid has increased or decreased more than a threshold.

8. The system of claim 6, wherein the first controller is further configured to:

cause, using the updated fuel demand, a controlled acceleration of the first aeroderivative gas turbine prior to reverting to the default fuel demand provided to the fuel value governor.

* * * * *